April 11, 1967  J. S. PAGE, JR  3,313,349
WELL TUBING TO ANNULUS FLOW CONTROLLING SAFETY VALVE
Filed May 11, 1964  5 Sheets-Sheet 2

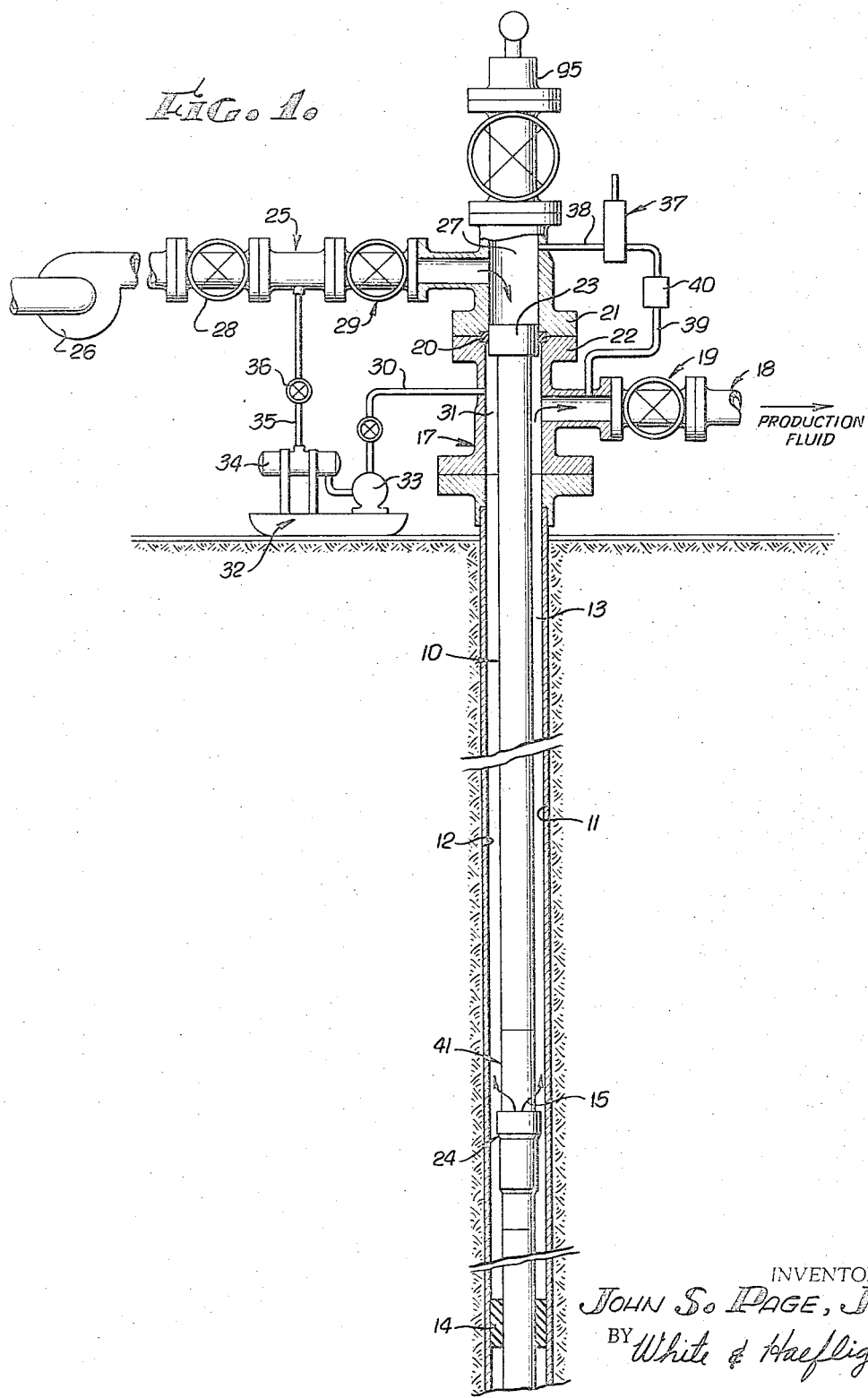

INVENTOR.
JOHN S. PAGE, JR.
BY White & Haefliger
ATTORNEYS.

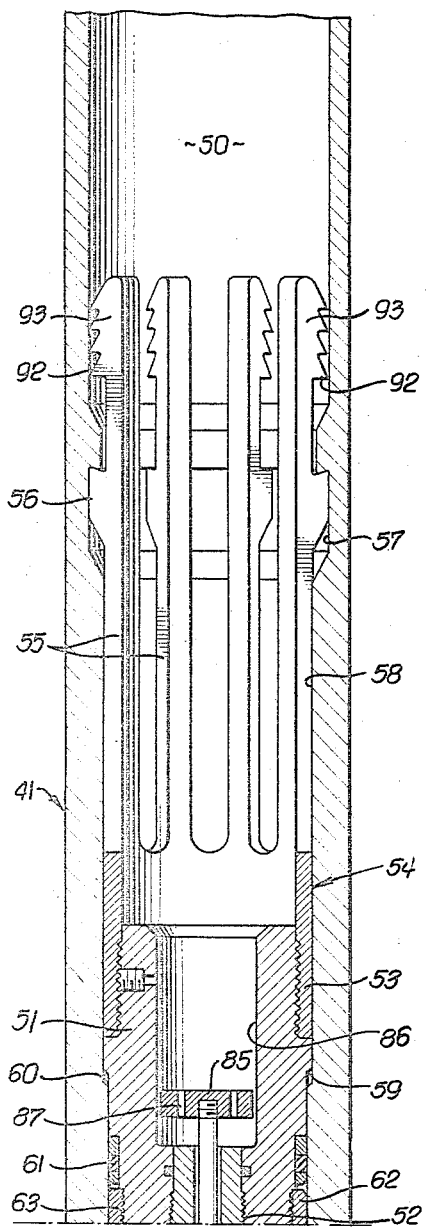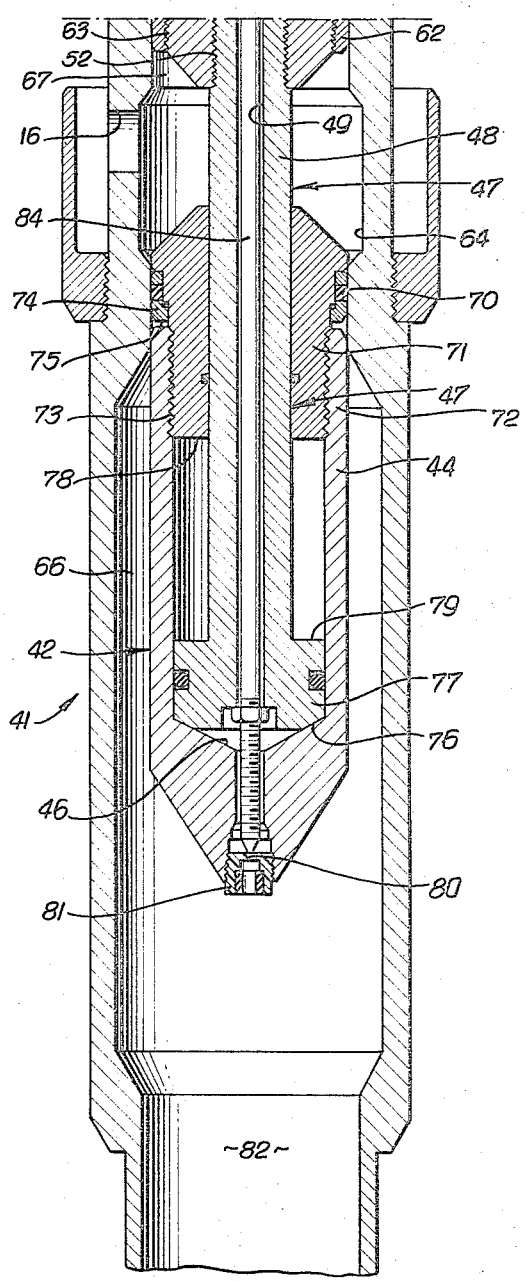

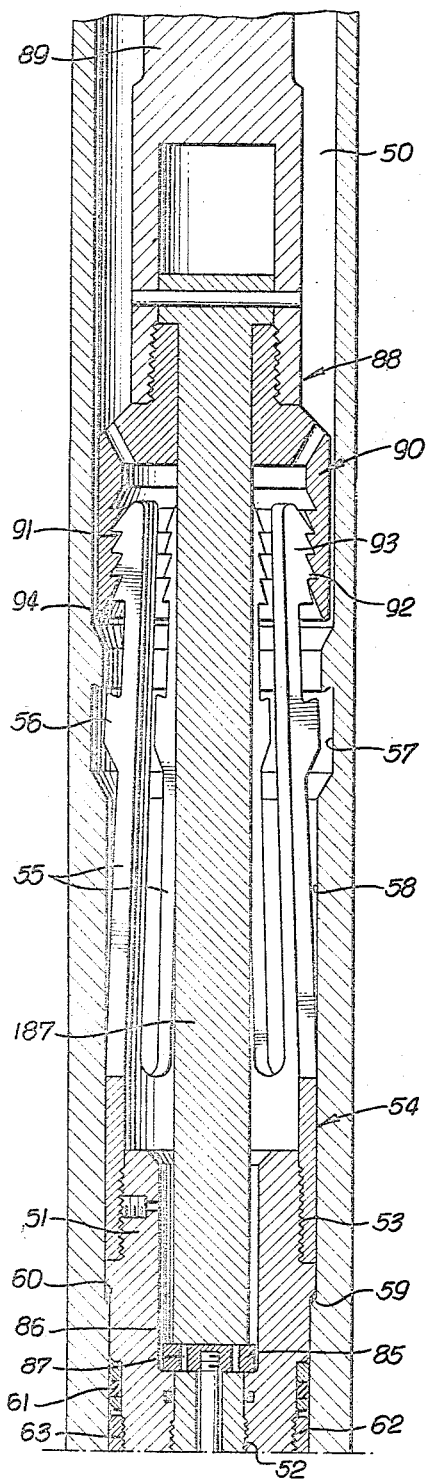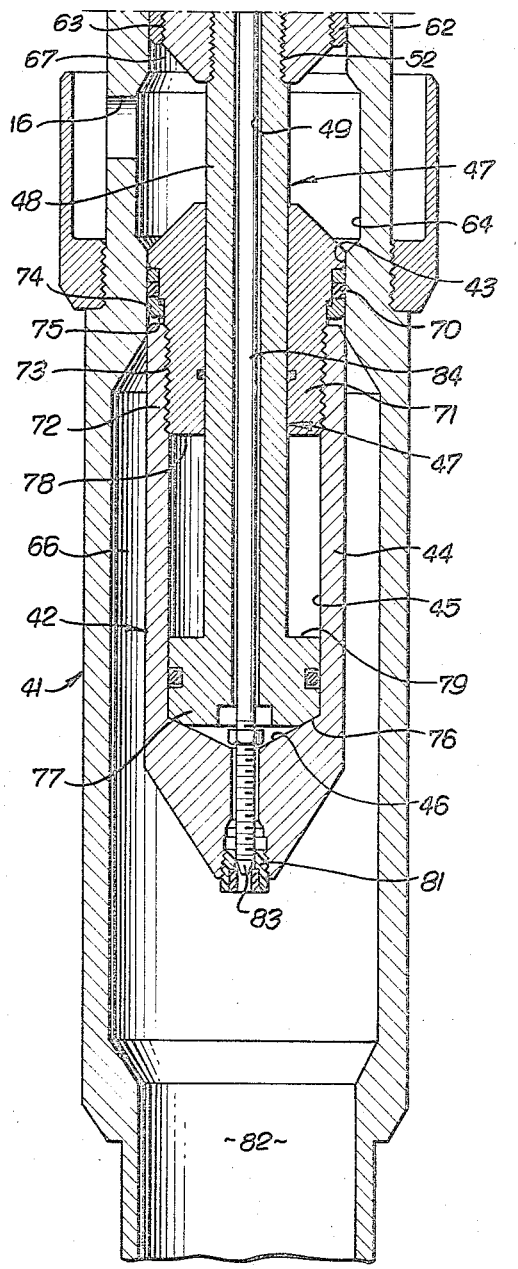

April 11, 1967  J. S. PAGE, JR  3,313,349
WELL TUBING TO ANNULUS FLOW CONTROLLING SAFETY VALVE
Filed May 11, 1964  5 Sheets-Sheet 5

INVENTOR.
JOHN S. PAGE, JR.
BY White & Haefliger
ATTORNEYS.

United States Patent Office 3,313,349
Patented Apr. 11, 1967

3,313,349
WELL TUBING TO ANNULUS FLOW CONTROLLING SAFETY VALVE
John S. Page, Jr., 1450 El Mirador,
Long Beach, Calif. 90815
Filed May 11, 1964, Ser. No. 366,303
27 Claims. (Cl. 166—45)

This invention relates generally to controlling production fluid flow in a well, and more particularly concerns apparatus and method for utilizing the pressure of control fluid in a tubing string to achieve surface control of a sub-surface valve that in turn controls upward flow of production fluid in the well.

In the past, production flow controlling sub-surface valves have been made surface operable to control the upward flow of production fluid entirely within the tubing string, as by passing control fluid pressure through auxiliary piping run into the well alongside the tubing, and from the surface to the valve sub-surface location. Since such auxiliary piping is exposed at the tubing exterior, it is subject to wear, deformation and breakage, as by scraping or other contact with the tubing and casing during running of the tubing in the well. Consequently, there is a need for a type of surface control of sub-surface valves which does not require the use of such exposed auxiliary piping.

The present invention has as one major object the provision of a simple and desirable method and apparatus to achieve such surface control of sub-surface valves, which eliminates need for the usual auxiliary piping. Basically, the method involves the step of flowing production fluid upwardly in the string to an exit point and then outwardly to the annulus for continued upward flow in the well, in such manner that the upwardly flowing fluid passes through a pressure differential responsive sub-surface control valve; subjecting the valve to a pressure differential created by transmission thereto of production fluid pressure and the opposing pressure of control fluid in the string above the valve; and finally varying the control fluid pressure to operate the valve. Typically, the pressure differential may be created by transmitting production fluid pressure in a direction tending to close the valve, and by transmitting the pressure of control fluid in the string above the valve in a direction tending to open the valve. As a result, complete control of the sub-surface valve to pass or block production fluid flow is achieved in an unusual manner, and without an auxiliary control line paralleling the tubing.

In the apparatus aspects, the invention concerns the combination comprising a tubing string in a well, the string having a side port through which well production fluid is flowable, apparatus packing off between the string and a bore in the well and below the level of the side port, and means connected in plugging relation with the string to be exposed to upward thrust transmitted by the upwardly flowing well production fluid, and also communicating with the string interior thereabove to be responsive to a change in string interior control fluid pressure for controlling the flow of production fluid through the side port and between a lower zone in the well below the packer apparatus and an upper zone in the well above the packer apparatus and outside the string. Typically, the above defined means element includes a valve member movable generally vertically between production fluid flow passing and blanking positions for effecting the flow control, and the means element has a surface located to receive thrust applied in response to downward exertion of control fluid pressure, the surface being out of communication with the flow port. In addition, the basic overall combination may include auxiliary means for effecting pressure communication between the control fluid exerting downward thrust applied to said surface and the well production fluid normally out of communication therewith, with the result that the valve member may then be opened more easily in the event of extreme production fluid pressure application holding the valve closed.

The invention has as another major object the provision of a novel and unusual assembly adapted for series connection in a tubing string in a well, to perform the functions of the means element referred to above. Basically, the assembly includes a vertical tubular housing or sub having the side port through which well production fluid is flowable, an annular seat in the housing to pass production fluid flowing to the side port, and means connected in plugging relation with the housing to be exposed to opposing thrust transmitted by production fluid and by control fluid in the string above the plug connection. The above mentioned valve member part of said means typically has a plug movable generally axially between seated and unseated positions to effect the flow control, the plug in unseated position being in the path of production fluid flowing toward the seat, and the valve member also incorporating the above mentioned surface to receive thrust transmitted by the control fluid, whereby valve member movement in controlling relation with production fluid flow may be effected by changing the control fluid pressure applied to the tubing string at the well surface.

In one form of the invention the means connected in plugging relation with the housing includes a collet having spring fingers inside and releasably attachable to the housing, the collet supporting the valve member for telescopic movement relative thereto; in another form of the invention the collet is made integral with the valve member for limited movement therewith; and in a third form of the invention the plug contains a cavity with the pressure receiving surface being located in the plug and at one side of the cavity.

Additional objects and advantages of the invention include the provision for upward recovery and replacement of the housing plugging means including the valve member in order to replace sand eroded valve parts, all without removing the string from the well; the unusually advantageous and simple construction and operation of the sealing structure between relatively moving parts of the plugging means; and the provision of an outer tubular string in the well to conduct the production fluid upwardly from the flow port in the housing and above the packer apparatus.

These and other objects and advantages of the invention, as well as the details of an illustrative embodiment, will be more fully understood from the following detailed description of the drawings, in which:

FIG. 1 is a vertical section showing the overall combination in a well environment;

FIGS. 3a and 3b are vertical sections showing the FIG. 2 valve member in closed position;

FIGS. 4a and 4b are vertical sections illustrating retrieval of the valve member and collet support therefor;

Figure 2A:
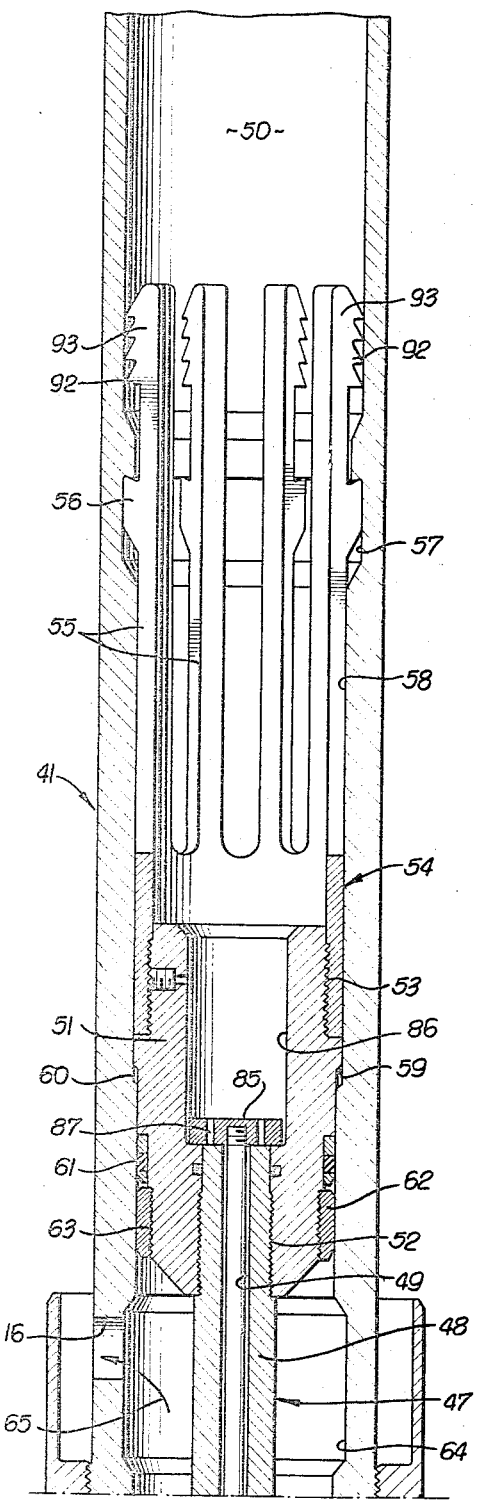
FIGS. 2a and 2b are enlarged vertical sections taken through one form of the valving apparatus in a well, and showing the valve member in open condition.

Referring first to FIG. 1, the overall combination includes a first tubing string generally designated at 10 in a well 11 provided with casing 12. The annulus 13 between the string and the casing is packed off at 14 below a side port in the string through which well production fluid is flowable from the string into the annulus above the packer, as generally represented by the arrows 15. Although the side port is not shown in FIG. 1, a typical version thereof is indicated at 16 in FIG. 2a. The production fluid flowing upwardly in the annulus arrives at the well head within the well head structure 17, from which it is delivered via a line 18 typically controlled by a valve 19.

The string 10 typically terminates within the well head structure 17 and is sealed off thereagainst as by the seal structure 20 contained between the flanges 21 and 22 of structure 17, the seal bounding the flanged portion 23 at the string upper terminal.

As will appear, control of the flow of production fluid into the annulus 13 and from the string 10 at the general location 24 is effected by changing the string interior control fluid pressure above the location 24. One way of accomplishing this control is shown in FIG. 1 to include a control fluid delivery line 25 to which control fluid pressure may be supplied as by pump 26, the pressure passing into the upper region 27 of the structure 17 and communicating with the interior of the string 10. The line 25 may be supplied with valves 28 and 29 for achieving further control, as will appear. Provision is also made for boosting the pressure of production fluid in the annulus 13 for supply to the control fluid in the string. One form of such boosting means is shown to include the line 30 communicating with the annulus 13 at 31 and delivering production fluid pressure to the boosting apparatus 32 including booster pump 33 and tank 34. From the latter the boosted pressure may be delivered through a line 35, a valve control at 36, and connecting to the control line 25. As will also appear, provision is made for venting the control fluid pressure, as for example by connecting a pilot operated vent 37 in a by-pass line 38 which communicates with the region 27 above the string upper open end. The vent 37 may also be connected via a line 39 and a check valve 40 with the production fluid delivery line 18, in order to vent the production fluid pressure for purposes as will appear.

Extending the description to FIG. 2, the overall combination includes means connected in plugging relation with the string 10 to be exposed to upward thrust transmitted by the upwardly flowing well production fluid within the string, and also communicating with the string interior above the plugging means in order to be responsive to a change in string interior control fluid pressure for controlling the flow of production fluid through the side port 16, and between a lower zone in the well below the level of the packer 14 and an upper zone in the well above the packer and outside the string.

More specifically, the string may include a tubular housing or sub 41 through which a side port 16 is formed, and containing the plugging means element referred to above. Typically, the plugging means includes a valve member movable generally vertically between seated and unseated positions to effect the flow control, one such valve member being generally indicated at 42 in FIG. 2b. In this regard, an annular seat 43 is located in the tubular housing 16 to receive the valve member in seated condition as better illustrated in FIG. 3b.

The valve member generally indicated at 42 includes a plug 44 containing a cavity 45 communicating with the string interior control fluid, and having a surface 46 located at the downward side of the cavity to receive thrust applied thereto in response to downward exertion of string interior control fluid pressure. For this purpose, the plugging means may include a valve member carrier structure 47 inside and releasably supported by the tubular housing 41 in the string, the valve member 42 being movable vertically on the carrier mandrel 48 containing a passage 49 to communicate control fluid pressure between the cavity 45 and the string interior 50 thereabove. The carrier structure 47 also may include a tubular part 51 having threaded connection to the mandrel 48 at 52, and also having threaded connection at 53 to a collet generally indicated at 54. The latter has spring fingers 55 inside the housing and releasably attached thereto in order that the collet may support the valve member, as through the carrier structure, for vertical movement relative to the collet and carrier structure.

Merely as illustrative, the collet spring fingers 55 have latches 56 receivable within the annular grooving 57 in the bore 58 of the tubular housing 41, the latching engagement with the grooving occurring upon downward landing of the plugging means within the string, as for example by landing of the flange surface 59 of part 51 on the flange surface 60 of the housing 41. The part 51 also carries an annular seal 61 retained in position by the ring 62 threaded at 63 on said part, the seal blocking downward access of the control fluid pressure within the string and above the plugging means to the production fluid within the zone 64 directly below the plugging means as seen in FIG. 2a.

Figure 2B:
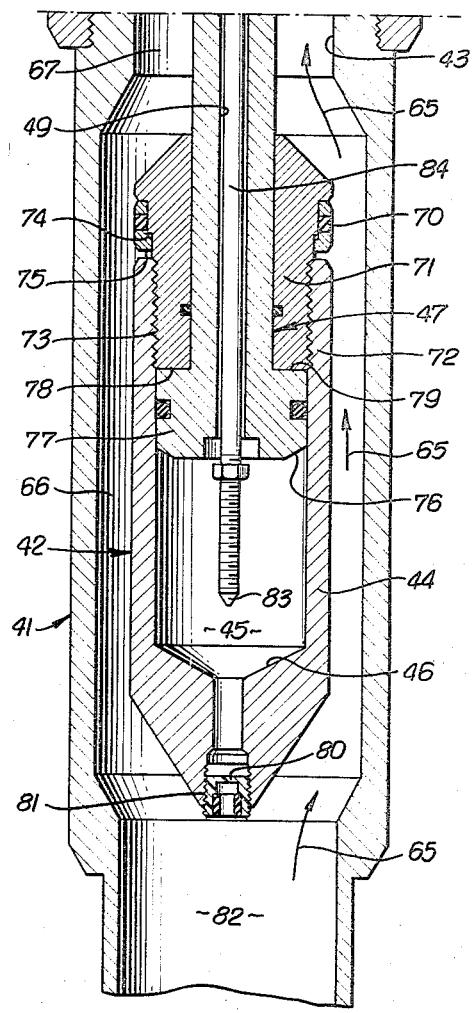

When the valve plug 44 is in the down position as shown in FIG. 2b, production fluid may flow upwardly as shown by the arrow 65 and through the annular space 66 between the plug and the housing 41, then through the annular space 67 inwardly of the seat 43 and finally out through the port 16 to the annulus 13. Typically, the valve plug may be kept in its down position of FIG. 2b by applying sufficient control fluid pressure downwardly through the string above the plugging means, in order to overcome any upward thrust exerted on the plug by the production fluid, whether such thrust results from upward velocity of the production fluid, upward pressure thereof, or a combination of these two. On the other hand, the plug 44 may be caused to move upward to closed position, as seen in FIG. 3b, as by decreasing the downward pressure application exerted by the control fluid on surface 46.

FIGS. 2b and 3b illustrate a seal ring 70 typically carried for pressurization by the well fluid in the string below the level of the port 16, for sealing off between the seat 43 and the valve plug part 71, the latter being threaded into the valve plug part 72, as indicated at 73. Typically, a piston ring 74 is carried for limited vertical displacement independently of the plug to allow ring 70 to deform under pressure and to exert pressure on the seal ring 70 in response to application to the piston ring of production fluid pressure within the string below the port 16. Both ring 74 and back-up ring 174 are bonded to elastomer seal ring 70, holding it against outward expansion or escape under high pressure differentials. Thus, production fluid pressure exerted upwardly on the surface 75 of the piston ring urges the latter upwardly to pressurize the seal ring 70, particularly when the latter is in seated position as shown in FIG. 3b, in order to more effectively and substantially seal off between the valve member and the seat. In the position shown in FIG. 3b, the surface 46 of the valve member engages the under surface 76 on the head 77 of the carrier mandrel 48, whereby upward movement of the valve member is limited. Downward movement of the valve member is limited by engagement of the under surface 78 of the plug part 71 with the upper surface 79 of the mandrel head 77.

That form of the invention shown in FIGS. 2 and 3 may also include rupturable and rupturing elements carried within the housing 41 to effect pressure communication between fluid in the cavity 45 and production fluid outside the plug 42, but within the housing, in order that the valve plug may be opened against extreme production fluid pressure exertion at such time as the valve member is to be upwardly retrieved. As an example of this, the rupturable element may include the diaphragm 80 carried by the small plug 81 threaded into the lower terminal of the plug 44 to separate the cavity 45 from the zone 82 directly below the plug and within the housing. The rupturing element may include a puncture part 83 suspended above the diaphragm by a rod 84, the upper terminal of which is headed at 85 in the bore 86 of the carrier part 51. The head 85 contains ports 87 normally adapted to pass control fluid pressure to the passage 49 communicating with the cavity 45, so that the rod 84 is adapted to float without causing the puncture part 83 to rupture the diaphragm.

On the other hand, reference to FIGS. 4a and 4b will show that the head 85 is subject to forcible downward displacement to cause the puncture part 83 to rupture the diaphragm when the valve member is in upper or closed position. Typically, the head 85 may be driven downwardly by the stem 187 of a pulling tool 88 when the latter is lowered downwardly in the string to retrieve the valve member, as for the purpose of replacing a worn or eroded valve plug 44. The pulling tool typically includes an upper stem 89 adapted to be lowered by a wire line, and also a cup 90 facing downwardly and having internal serrations 91 adapted to engage the external serrations 92 on the upper extensions 93 of the spring fingers 55. In this process, the fingers are cammed inwardly by the upwardly tapering cam shoulder 94 of the cup 90 to unlatch the fingers from the grooving 57 in the housing 41. Accordingly, as shown in FIGS. 4a and 4b, the valve member is ready to be upwardly retrieved, and the pressure of the production fluid and the control fluid acting oppositely on the plugging means is equalized in view of rupturing of the diaphragm. It should also be observed that the valve member, its carrier structure and the collet are sized for upward withdrawal from the housing and through the string. FIG. 1 shows the removable cap 95 at the well head structure 17, for gaining entrance to the string upper interior for running the wire line suspending the pulling tool described.

The method of controlling production fluid flow in a well containing a tubing string includes flowing production fluid upwardly in the string and then to the exterior thereof, as for example through the port 16, for continued upward flow in the well in such manner that the upwardly flowing production fluid passes a pressure differential responsive control valve, as for example the valving member 42, and subjecting the valve to a pressure differential created by transmission thereto of production fluid pressure and the opposing pressure of control fluid in the string above the valve, and finally varying the control fluid pressure to operate the valve. More specifically, the valve may be subjected to a pressure differential by transmitting production fluid pressure in a direction tending to close the valve, and by transmitting the pressure of control fluid in the string above the valve in a direction tending to open the valve. The step of varying the control pressure to operate the valve may include boosting the pressure of the production fluid delivered at the well head, as for example in the boosting apparatus 32 seen in FIG. 1, and controllably applying the boosted pressure to the control fluid in the string, as for example by closing valve 28, and adjusting the openings of valves 36 and 29.

The control pressure varying step may also include controllably venting the control fluid pressure within the string at the well head or the surface to effect closing of the sub-surface valve member 42. For example, the control pressure may be vented at 37 and sufficiently to effect upward closing of the valve member 42.

Preliminary steps of the method typically include packing off about the string 10, as for example by means of the packer 14, to block downward flow of production fluid at the string exterior, i.e. in the annulus 13, and plugging the string 10 above the pack-off level to block intercommunication of the production fluid with the control fluid, the plugging step typically being carried out as by landing the valve member 42, its carrier structure and the collet into the FIG. 2 position in the string.

Figure 5:
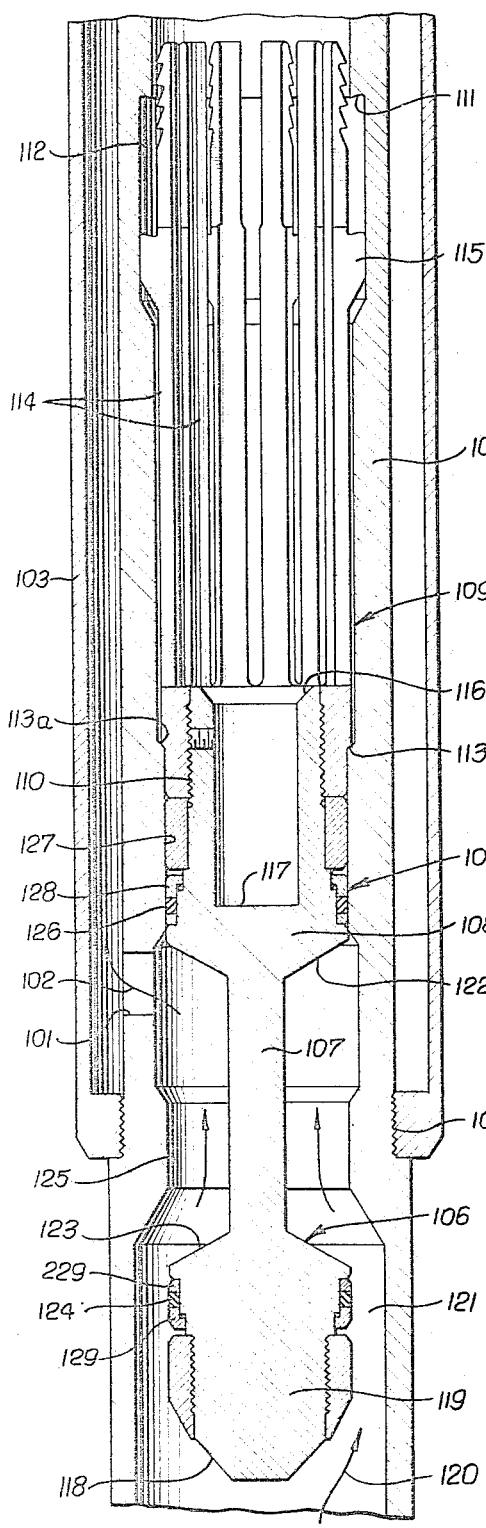
FIG. 5 is a vertical section taken through a modified form of valving apparatus in a well.

Referring now to FIG. 5, the tubular housing 100 connectible in the string has a side port 101 through which production fluid is flowable as indicated by the arrow 102 from the interior of the housing to the exterior thereof and into an outer string tubular section 103. The latter may be considered as part of a second tubular string in the well for enclosing sufficient of the first tubular string and having such sealing relation therewith that well production fluid flowing into the outer or second string is confined for upward flow therein out of communication with the packer 14. The sealing relation of the second tubular string with the housing may for example be established at the thread location 104.

The housing 100 is plugged by the means generally indicated at 105 which includes the valve member 106 suspended by the stem 107 and the carrier 108 to which the collet 109 is attached as at the threading 110. Accordingly, the collet is integral with the valve member in order to have limited movement vertically therewith, the upper limit being established by the upper shoulder 111 of the grooving 112 in the housing. The lower limit of collet travel is established by engagement of the collet shoulder 113 with the landing shoulder 113a formed in the housing 100. The collet spring fingers 114 support latches 115 which are movable vertically within the grooving 112.

Downward pressure of control fluid within the string is exerted on the carrier 108, as for example on the surfaces 116 and 117 thereof in order to urge the valve member downwardly toward open position. Upward pressure tending to close the valve member is applied against the under surface 118 of the valve member plug 119, and by the production fluid flowing upwardly as indicated by the arrow 120. The production fluid flows outwardly of the open valve plug in the space 121 and then upwardly to exit through the side port 101. Pressure of production fluid flowing upwardly above the plug 119 is equalized as applied to the valve member by virtue of upward application against the under surface 122 of the carrier 108, and the equal area upper surface 123 of the plug 119.

A lower seal ring 124 is carried by the plug 119 to seal off and become confined between the annular seat 125 and the plug 119 when the valve member is in seated position restricting upward flow of production fluid. An upper seal ring 126 is carried and confined to seal off at all times between the valve member carrier 108 and an inwardly facing bore 127 within the housing, in order that the plugging means 105 may effectively plug the housing by blocking access of the control fluid to the side port 101. An upper piston ring 128 is carried for vertical displacement independently of the valve member to exert pressure acting downwardly upon the upper seal ring in response to control fluid pressure transmission to the piston ring. A lower piston ring 129 is carried for vertical displacement independently of the valve member to exert pressure acting on the lower seal in response to production fluid pressure transmission to the lower piston ring. Such transmission acts to urge the lower piston ring upwardly to pressurize the ring 124 for sealing against the seat 125. Ring 129 and back-up ring 229 are bonded to elastomer ring 124, holding it against outward expansion or escape under high pressure differentials. Ring 129 is movable to allow deformation of ring 124 under pressure.

It will also be observed that the valve member 106 including plug 119, stem 108 and the carrier 122 as well as the collet 109 are sized for upward retrieval from the housing 100.

Figure 6:
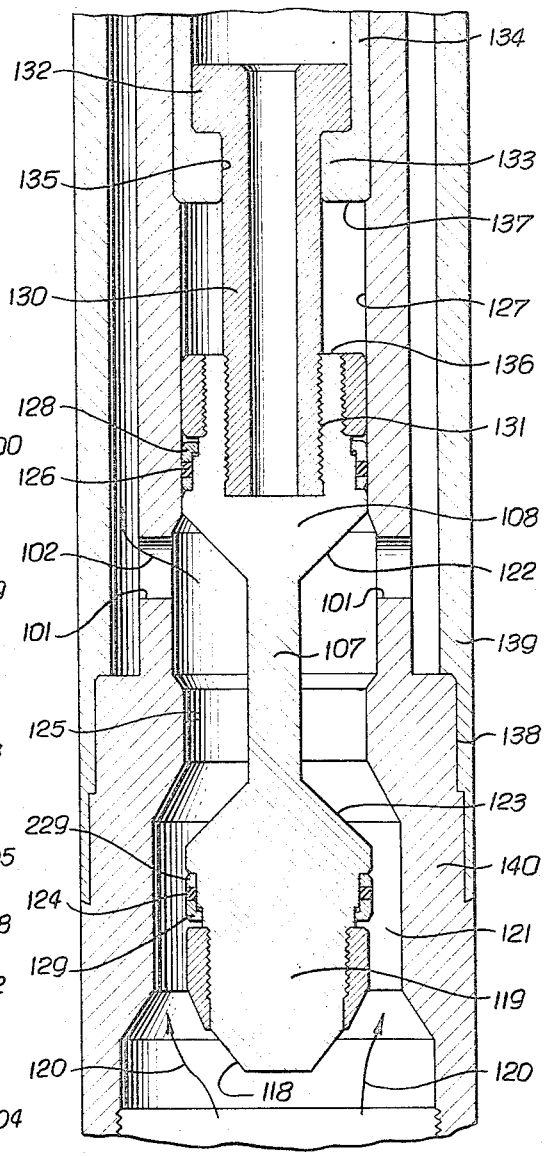
FIG. 6 is a vertical section taken through a second modified form of valving apparatus.

Referring now to FIG. 6, the structure shown is basically the same as that described in FIG. 5, with like parts bearing the same numerals. The principal difference consists in the provision of a valve member carrier mandrel 130 threaded into the carrier 108 at 131. The mandrel has a head 132 which is engageable with an internal flange 133 carried by the collet 134 to limit downward travel of the valve member relative to the collet. The latter has spring fingers, not shown, the same as illustrated in FIGS. 2–4, whereby the collet does not move with the valve member. Rather, the collet supports the latter for telescopic movement relative thereto, with the carrier mandrel 130 moving vertically through the bore 135 of the collet flange 133. Accordingly, upward travel of the valve member in closed position is limited by engagement of the upper shoulder 136 of the carrier 108 with the under surface 137 of the collet flange 133.

There is also a slight difference in construction embodied in the attachment at 138 of the outer or second tubular string 139 with the tubular housing body portion 140.

I claim:

1. In combination, a first tubing string in a well, the string having a side port through which well production fluid is flowable, apparatus packing off between the string and a bore in the well and below the level of said side port, and means having a first pressure receiving surface to be exposed to upward thrust transmitted by the upwardly flowing well production fluid and a second pressure receiving surface communicating with the string interior above said means to be responsive to a change in string interior control fluid pressure for controlling the flow of production fluid through said side port and between a lower zone in the well below the level of the packer apparatus and an upper zone in the well above the packer apparatus and outside the string.

2. In combination, a first tubing string in a well, the string having a side port through which well production fluid is flowable, apparatus packing off between the string and a bore in the well and below the level of said side port, and means including a valve member connected in plugging relation with the string to be exposed to upward thrust transmitted by the upwardly flowing well production fluid and having a pressure receiving surface communicating with the string interior above said means to be responsive to a change in string interior control fluid pressure for controlling the flow of production fluid through said side port and between a lower zone in the well below the level of the packer apparatus and an upper zone in the well above the packer apparatus and outside the string, said valve member being movable generally vertically between production fluid flow passing and blanking positions for effecting said flow control, said surface being out of communication with said flow port.

3. The combination of claim 2 including auxiliary means for effecting pressure communication between the control fluid exerting downward thrust applied to said surface and the well production fluid normally out of communication therewith.

4. The combination of claim 2 in which said means includes a carrier for said valve member inside and releasably attached to the string, the valve member being telescopically movable relative to the carrier.

5. The combination of claim 2 in which said means includes a carrier for said valve member movable vertically with said valve member and remaining inside and releasably attached to the string during said movement.

6. The combination of claim 2 in which said valve member contains a cavity communicating with said control fluid, and out of communication with said flow port, said surface being contained by the valve member within said cavity.

7. The combination of claim 2 including a second tubular string in the well enclosing sufficient of the first tubular string and having such sealing relation therewith that well production fluid flowing outwardly through said flow port is confined for upward flow in said second tubular string out of communication with said packing apparatus.

8. In combination, a first tubing string in a well, the string including a tubular housing having a side port through which well production fluid is flowable, apparatus packing off between the string and a bore in the well and below the level of said side port, an annular seat located in the housing to pass production fluid flowing to said port, and means including a valve member connected in plugging relation with the string to be exposed to upward thrust transmitted by the upwardly flowing production fluid and having a pressure receiving surface communicating with the string interior above said means to be responsive to a change in static pressure of string interior control fluid for controlling the flow of production fluid through said side port and between a lower zone in the well below the packer apparatus and an upper zone in the well above the packer apparatus and outside the string, said valve member being movable generally vertically between seated and unseated positions to effect said flow control whereby control of valve member movement between said positions to control the upward flow of well production fluid may be effected by changing the string interior control fluid pressure applied downwardly at said surface.

9. The combination of claim 8 in which the valve member includes a plug, and a seal ring carried for pressurization by the production fluid in the string below said port and for sealing off between the seat and plug.

10. The combination of claim 9 including a piston ring carried for vertical displacement independently of the plug to exert pressure on the seal ring in response to application to the piston ring of production fluid pressure in the string below said port.

11. The combination of claim 9 in which the plug contains a cavity communicating with the string interior control fluid, and out of communication with said port, said surface being contained by the valve member within said cavity, said means including a valve member carrier inside and releasably supported by the string, the valve member being movable on the carrier and the carrier containing a passage to communicate control fluid pressure between said cavity and the string interior thereabove.

12. The combination of claim 11 including rupturable and rupturing elements carried within the housing to effect pressure communication between fluid in the cavity and production fluid outside the valve plug, at least one of said elements being actuable to move independently of the valve member and into rupture effecting engagement with the other element.

13. The combination of claim 9 in which said means includes a collet having spring fingers inside the housing and releasably attached thereto, the collet supporting the valve member for telescopic movement relative thereto.

14. The combination of claim 9 in which said means includes a collet having spring fingers inside the housing and releasably attached thereto, the collet being integral with the valve member for limited movement therewith.

15. The combination of claim 9 in which said means includes a seal ring carried by the valve member above the level of said port for engaging an inwardly facing bore within the housing, thereby to seal off communication of said control fluid and production fluid.

16. The combination of claim 1 including means for boosting the pressure of the well production fluid delivered at the well head and for applying said boosted pressure to the control fluid in the string.

17. The combination of claim 2 including a check valve connected at the well head to pass well production fluid for venting while blocking reverse flow of fluid through the check valve, and other means connected at the well head to vent the control fluid pressure in order to effect a reduction in the control fluid pressure applied at said surface.

18. An assembly adapted for series connection in a tubing string in a well, the tubing string to contain control fluid, said assembly comprising a vertical tubular housing having a side port through which well production fluid is flowable, an annular seat located in the housing to pass production fluid flowing to said port, and means in the housing connected in plugging relation therewith to be exposed to upward thrust transmitted by the upwardly flowing production fluid and also to communicate with the string interior above said means so as to be responsive to a change in the stratic pressure of string interior control fluid for controlling the flow of production fluid through the side port and between a lower zone in the well and an upper zone in the well outside the string, said means including a valve member movable generally vertically between seated and unseated positions to effect said flow control, said member having a surface located to receive thrust applied thereto in response to downward exertion of string interior control fluid pressure, whereby control of valve member movement between said positions to control the upward flow of well production fluid may be effected by changing the string interior control fluid pressure applied downwardly at said surface.

19. The combination of claim 18 in which the valve member includes a plug containing a cavity and said surface being within the cavity, said means including a valve member carrier releasably supported by the housing, the valve member being movable on the carrier and the carrier containing a passage to communicate control fluid pressure to said cavity.

20. The combination of claim 18 in which said means includes a collet having spring fingers inside the housing and releasably attached thereto, the collet supporting the valve member for telescopic movement relative thereto.

21. The combination of claim 18 in which said means includes a collet having spring fingers inside the housing and releasably attached thereto, the collet being integral with the valve member for limited movement therewith.

22. The combination of claim 18 in which said means includes a lower seal ring carried to seal off and become confined between the seat and plug when the valve member is in seated position restricting upward flow of production fluid, an upper seal ring carried and confined to seal off at all times between the valve member and an inwardly facing bore within the housing in order that said means may effectively plug said housing by blocking access of said control fluid to said side port, an upper piston ring carried for vertical displacement independently of the valve member to exert pressure acting on said upper seal ring in response to control fluid pressure transmission to the upper piston ring, and a lower piston ring carried for vertical displacement independently of the valve member to exert pressure acting on the lower seal ring in response to production fluid pressure transmission to the lower piston ring.

23. In sub-combination, an axially elongated tubular housing adapted for series connection in a tubing string in a well and having a side port through which main fluid is flowable, an annular seat located in the housing to pass main fluid flowing to said port, and means in the housing remaining connected in plugging relation therewith and having a first pressure receiving surface to be exposed to thrust transmitted upwardly by the main fluid and a second pressure receiving surface to be exposed to thrust transmitted downwardly and through one end of the housing by string interior control fluid remaining out of communication with said port, said means including a valve member responsive to said thrust transmission and having a plug movable generally axially between seated and unseated positions to effect said flow control, the plug in unseated position being in the flow path of main fluid flowing to pass said seat, whereby control of valve member movement between said positions to control main fluid flow may be effected by changing the conrtol fluid pressure applied at said second surface.

24. The method of controlling production fluid flow in a well containing a tubing string, that includes establishing a barrier across the string interior, flowing production fluid upwardly in the string and then to the exterior thereof for continued upward flow in the well in such manner that the upwardly flowing fluid passes a pressure differential responsive control valve, subjecting said valve to a pressure differential created by transmitting production fluid pressure to bodily move the valve in one vertical direction and by transmitting interiorly of the string the pressure of control fluid confined therein and acting via said barrier to bodily move the valve in the opposite vertical direction, and varying said control fluid pressure to operate the valve.

25. The method of claim 24 in which said varying step includes boosting the pressure of the production fluid delivered at the well head and controllably applying said boosted pressure to the control fluid in the string.

26. The method of claim 24 in which said varying step includes controllably venting the control fluid pressure within the string at the well surface to effect closing of the valve.

27. The method of claim 24 including the preliminary steps of packing off about the string to block downward flow of production fluid at the string exterior, and establishing said barrier above the pack-off level to block intercommunication of the production fluid with the control fluid.

References Cited by the Examiner
UNITED STATES PATENTS

| | | | |
|---|---|---|---|
| 2,963,089 | 12/1960 | Sizer | 166—224 |
| 3,050,132 | 8/1962 | Page | 166—224 |
| 3,126,965 | 3/1964 | Lindsey | 166—224 |
| 3,156,300 | 11/1964 | Page et al. | 166—224 |

CHARLES E. O'CONNELL, *Primary Examiner.*

J. A. LEPPINK, *Assistant Examiner.*